Sept. 26, 1933.                H. A. M. CLARK                1,928,169
                           ELECTRIC SOUND RECORDER
                            Filed July 16, 1931            2 Sheets-Sheet 1

H. A. M. Clark
INVENTOR
By: Marks & Clerk
ATTYS.

Sept. 26, 1933.   H. A. M. CLARK   1,928,169
ELECTRIC SOUND RECORDER
Filed July 16, 1931   2 Sheets-Sheet 2

H. A. M. Clark
INVENTOR
By: Marks & Clark
Attys.

Patented Sept. 26, 1933

1,928,169

UNITED STATES PATENT OFFICE 1,928,169

ELECTRIC SOUND RECORDER

Henry Arthur Maish Clark, London, England, assignor to Columbia Graphophone Company, Limited, London, England Application July 16, 1931, Serial No. 551,234, and in Great Britain July 19, 1930.

2 Claims. (Cl. 179—100.41)

This invention relates to moving coil apparatus such as sound recorders and sound reproducers and like apparatus with particular reference to the field systems adopted with such devices.

It is found in practice that in order to obtain sufficient electro-mechanical damping in the moving coil circuit it is essential to use a magnetic field of ten thousand or more lines per square centimetre while at the same time in the case of a recorder or reproducer it is necessary to keep the total mass of the apparatus to a minimum in order to reduce wear and eliminate other disadvantages and difficulties (especially in connection with the free mounting or floating of the system) incidental to the employment of a recorder or reproducer of relatively large mass.

The object of the present invention is to fulfil the requirements necessary for the construction of an efficient and practicable apparatus by providing the largest possible steady flux linking the moving coil while maintaining the weight of the apparatus at a minimum and with this object in view the invention consists in electromagnetic moving coil vibratory apparatus comprising a field system formed of one or more magnetizing windings mounted upon a pole or poles formed partially or wholly of material having a magnetic saturation flux density higher than that of pure iron.

The invention further consists in electromagnetic moving coil vibratory apparatus comprising a field system formed of one or more magnetizing windings mounted upon a pole or poles formed partially or wholly of material such that the ratio of its magnetic saturation flux density to its specific gravity is greater than the same ratio for pure iron.

The invention further consists in electromagnetic apparatus as set forth above comprising a substantially U-shaped magnet formed of two poles connected together at one end by a uniting yoke, which may be integral with the poles.

The invention also consists in electromagnetic apparatus as set forth above wherein the field system is freely mounted (for example by floating upon rigid knife edges).

Further features of the invention will be apparent from the description given hereafter of one modification thereof which will be more readily understood by reference to the accompanying drawings wherein:—

Figure 1:
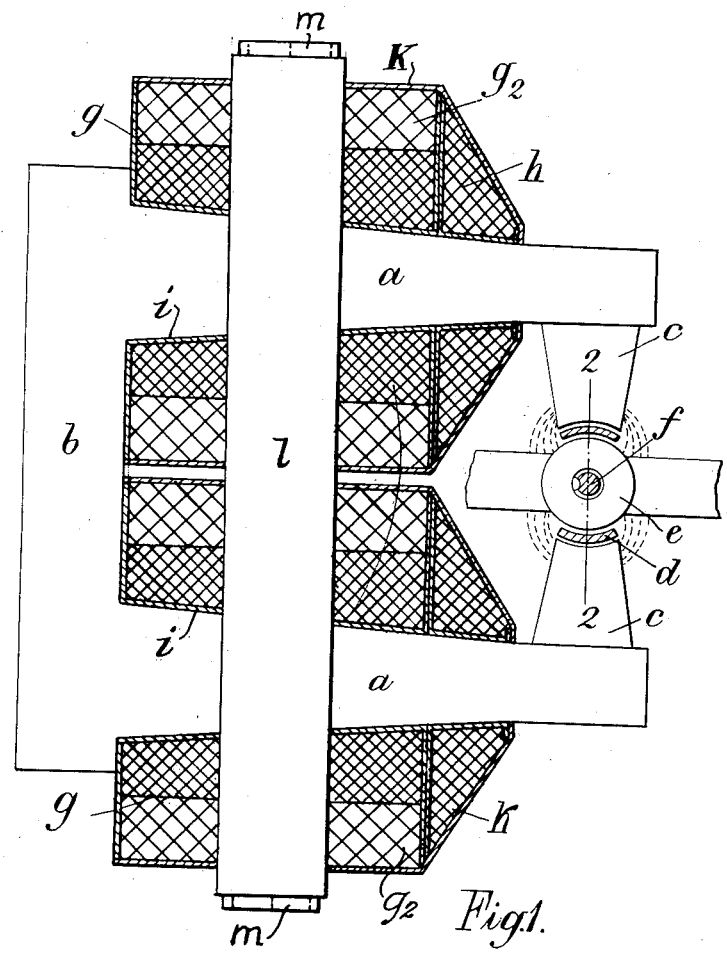
Figure 1 represents in sectional plan.
Figure 2:
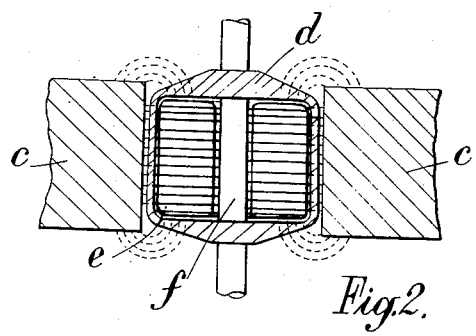
Figure 2 represents in sectional elevation along the line 2—2 of Figure 1 the field system of a moving coil sound recorder in accordance with the invention.

In carrying my invention into effect in one convenient manner as, for example, in its application to the moving coil sound-recording apparatus shown in Figures 1 and 2, I form the main magnetic circuit consisting of the poles $a$, $a$ and uniting yoke $b$ from a suitable cobalt iron alloy having a very high magnetic saturation value. For this purpose the alloy described by Yensen in the Journal of the A. I. E. E. for 1915 is very suitable, comprising approximately 33 per cent. of cobalt and 67 per cent. iron, corresponding to the chemical formula $Fe_2Co$. The specific gravity of this alloy is not very different from that of iron so that since its magnetic saturation value is considerably greater than that of iron the ratio of its saturation value to its specific gravity is also greater than that for iron and for any given weight an increased flux may be secured or alternatively any desired flux may be obtained with less weight of this alloy than if iron were employed. The poles may be gradually tapered or narrowed from the yoke towards their outer ends so as to maintain the flux density in the system as nearly constant as possible having regard to the leakages that occur at different parts of the system.

At the outer ends of the poles $a$, $a$ we provide two pole-pieces $c$, $c$ between which the moving coil $d$ is located and which are tapered or narrowed from the part where they join the poles towards their outer ends where they are in close proximity to the moving coil and the width of the pole-pieces at their ends should be very little more than the width of the coil sides in order to crowd the flux through the coil. On the other hand the height of the pole-pieces should be slightly greater than the height of the coil sides in order that the coil may be made to embrace a proportion of what would otherwise be a leakage flux and thus a slightly increased efficiency will result.

The coil $d$ may consists of a single short-circuited turn suitably pivoted for movement and having a central core $e$ passing therethrough, which core is limited in size by the moving coil and which is shaped so as to provide maximum area across the path of the steady flux flowing across the moving coil sides while at the same time being capable of entering the moving coil and allowing the central shaft $f$ (if any) to pass through it.

In the case of a transformer coupled single turn moving coil the core must also be designed with due consideration for the alternating flux which travels in a direction normal to the steady flux and hence a material must be chosen of composition and form such that the hysteresis and eddy current losses are a minimum. Moreover it is preferable to arrange that the core $e$ shall be the first portion of the circuit to be saturated, every other part of the iron circuit being saturated simultaneously at a slightly higher magnetizing force.

The conditions above referred to make it preferable to employ a laminated core $e$ (Fig. 2) within the moving coil and we may therefore conveniently form the same from pure iron sheet (iron sold under the proprietary name of Armco being suitable) since while the cobalt alloy above referred to would be suitable from the point of view of flux density it is not so convenient to prepare in the form of laminations. It must be understood however that the use of laminations of the alloy above referred to or of any other suitable alloy for the core within the coil is not precluded from the invention.

The magnetizing windings $g$ contribute a large proportion of the total weight of the device and in order to extract the utmost efficiency from the windings so as to be able to reduce the weight as much as possible they are preferably graded. The bobbins $i$ (Fig. 1) may be made of aluminium and are made to fit closely on the tapered poles, and the windings are divided into, say, two portions, the inner part $g_1$ being wound with a slightly smaller gauge of wire than the outer part $g_2$ while since one effect due to leakage is that the exciting turns nearer the pole-pieces are more useful than those nearer the yoke I provide as many turns as possible close to the ends of the poles as, for example, I may arrange at the pole ends conical or tapered coils $h$ in series with the main coils and shaped so as to house the maximum number of turns without fouling the alternating flux iron circuit on the core $e$ above referred to. Moreover, the coils $g$, $h$ are preferably short and "stumpy", rather than long and slender and all the coils are preferably enclosed in spun aluminium containers $k$ (Fig. 1) so that they are thus surrounded by a heavily short-circuited turn which prevents the rise of excessive back E. M. F.'s when the field current is suddenly switched off and the use of shunt resistances to absorb this E. M. F. is thus avoided.

A greater over-all efficiency of the field windings may be obtained by subjecting them to forced cooling so that a smaller cross-section of copper may be utilized with consequent gain in lightness. The coils may be enclosed leaving a duct all round them and in the case of a sound recorder the cooling air may be drawn through such duct, the existing system used to remove the wax cuttings being utilized for the purpose.

Figure 3:
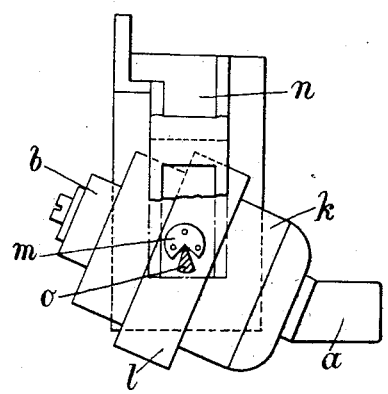
Figure 3 represents a side view of the recorder mounted ready for use in its bearings in a bracket, partially broken away.
Figure 4:
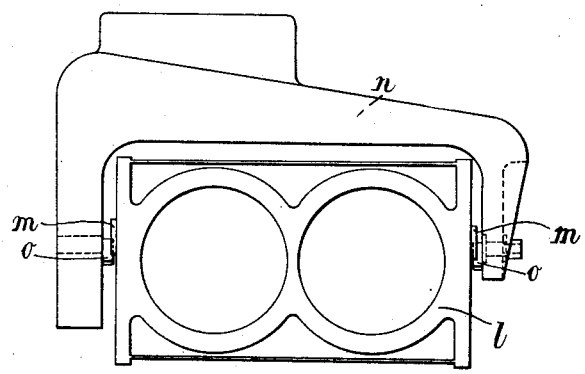
Figure 4 represents an end view of the clamping plate and bracket which carry the recorder.

The mounting of a recorder constructed in accordance with the invention, as described above, is effected by means of a clamping plate $l$ (Figure 1) which at a suitable point surrounds the containers $k$ and firmly grips them. At the outer ends of this plate are provided bearing plates $m$ having V-shaped notches, and the whole device is slipped within a bracket $n$ (Figure 3) of inverted U-shape, rigidly secured to a fixed support and adapted to overhang the recording table. Knife edges, $o$, on the inner surface of the bracket $n$ receive the V-shaped notches of the plates $m$, the recorder being thus pivoted about their point of contact.

The invention is applicable to sound recorders (either of the type adapted to cut a sinuous record groove in wax or like material, or of the type in which the moving coil causes oscillations of a mirror or like member in an optical system to be recorded on a film or by other light sensitive means), microphones, loud speakers or other sound reproducers, or like moving coil apparatus, and is not to be limited to the details of construction hereinbefore given by way of example since I may modify the construction and arrangement of the moving coil, the number and mode of disposition of the magnetic coils employed for the magnetic circuit associated with the moving coil and the form, construction and material of such magnetic circuit depending upon any practical requirements that may have to be fulfilled.

What is claimed,

1. An electromagnetic moving coil recording apparatus for cutting a sound record in wax, comprising a magnetic field system formed of material having a magnetic saturation flux density greater than that of pure iron, a holder for said system, and pivotal supports associated with said holder whereby the system is freely mounted in such a manner as to accommodate irregularities in the wax surface.

2. An electromagnetic moving coil recording apparatus according to claim 1 wherein said magnetic field system is formed of an alloy comprising 33 per cent. cobalt and 67 per cent. iron.

HENRY ARTHUR MAISH CLARK.